Aug. 7, 1962 T. M. BREEN 3,048,417
TOY VEHICLE WITH ADJUSTABLE SEAT AND LEG PROTECTOR
Filed April 12, 1961
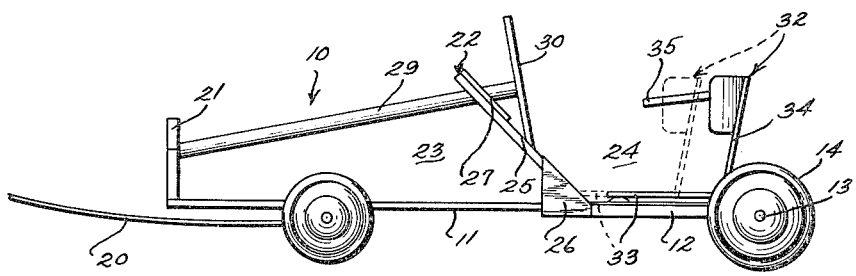
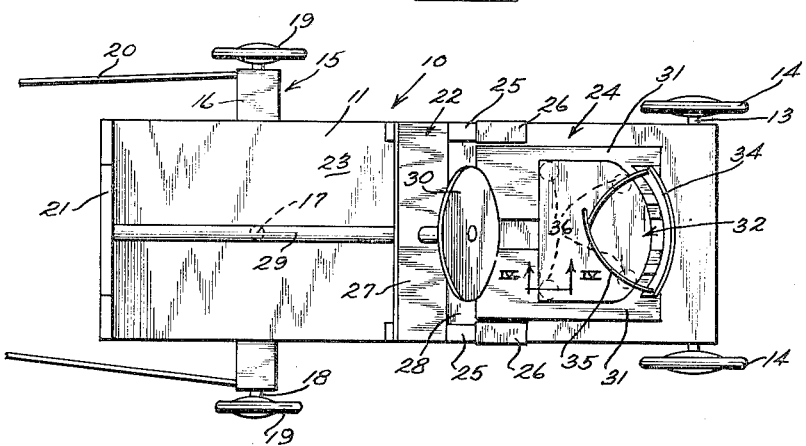
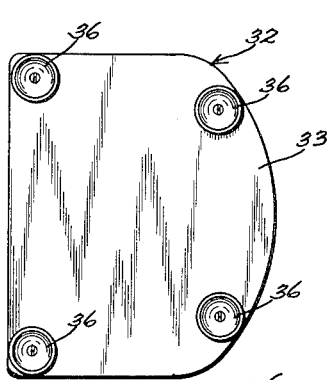
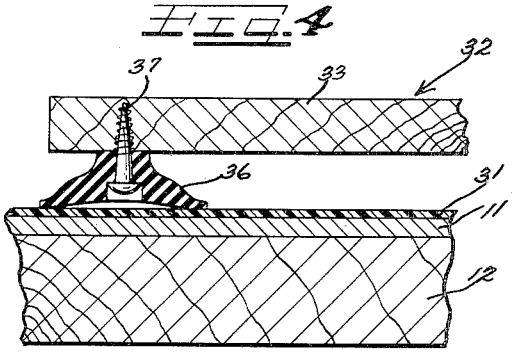
INVENTOR.
THOMAS M. BREEN
BY
ATTORNEYS

United States Patent Office 3,048,417
Patented Aug. 7, 1962

3,048,417
TOY VEHICLE WITH ADJUSTABLE SEAT AND LEG PROTECTOR
Thomas M. Breen, 140 Sheridan Road, Winnetka, Ill.
Filed Apr. 12, 1961, Ser. No. 102,501
1 Claim. (Cl. 280—1.1)

This invention relates to a toy vehicle for small children and infants and more specifically deals with a toy automobile having an adjustable safety seat for easy placement and removal of an infant or small child without the use of tools or manipulation of mechanical devices such as have heretofore been required.

The invention will hereinafter be specifically described as embodied in a toy automobile but it should be understood that the principles of this invention are generally useful in seating a small child or infant on a toy in proper position relative to equipment on the toy regardless of the size of the child or infant. Therefore this invention is not limited to the hereinafter described and illustrated preferred embodiment.

According to this invention a rectangular platform or base frame is supported at the rear end by wheels on a fixed axle and at the front by wheels on a swing axle assembly. The front wheels are spaced apart a greater distance than the rear wheels to enhance stability of the platform and the swing axle assembly has full bearing engagement with the underface of the platform in all positions of the assembly to prevent tilting of the platform. A dashboard assembly is mounted on the platform and extends upwardly and forwardly from a midportion of the platform between the front and rear wheels to provide a simulated engine compartment and a rear passenger compartment. The dashboard assembly is arranged so that the feet and legs of the child will project therethrough thereby protecting the rider. A main feature of the invention includes the selective mounting of a seat rearwardly of the dashboard assembly on the platform. The passenger compartment of the platform rearwardly of the dashboard is equipped with linoleum or other impervious pads. The bottom of the seat is equipped with suction cups for engaging the pads. A simulated steering wheel projects from the dashboard into the passenger compartment and the seat is easily positioned relative to the dashboard and the steering wheel on the linoleum pads to properly position the child relative to the dashboard and steering wheel regardless of the size of the child. The seat is preferably equipped with a belt or harness to further protect the child.

If desired, according to this invention, the seat can be completely removed from the platform and the child strapped to the seat in its removed postion for subsequent securing to the platform. The forward incline of the dashboard facilitates placement of the child on the platform.

It is then an object of this invention to provide a toy vehicle or the like with an adjustable safety seat that is readily attached to and removed from the vehicle without manipulation of mechanical devices or without requiring the use of tools.

A further object of this invention is to provide a toy automobile with a suction cup equipped seat that is easily postioned on the automobile at locations best suited to the size of the occupant of the seat.

A still further object of this invention is to provide a toy vehicle with a removable suction cup equipped seat and with suction cup receiving surfaces providing for a wide selection of positions for the seat relative to fixed members on the toy.

Another object of this invention is to provide a toy automobile for small children and infants with a dashboard receiving the child's legs therethrough and with a suction cup equipped seat behind the dashboard that is easily adjusted relative to the dashboard to accommodate children of many different sizes.

Other and further objects of this invention will be apparent to those skilled in this art from the following detailed description of the annexed sheet of drawings which, by way of a preferred example only, illustrates one embodiment of the invention.

On the drawings:

FIGURE 1 is a side elevational view of the toy automobile of this invention.

FIGURE 2 is a top plan view of the toy automobile of FIG. 1.

FIGURE 3 is an enlarged bottom plan view of the seat of the toy automobile of FIGS. 1 and 2.

FIGURE 4 is an enlarged fragmentary vertical cross-sectional view taken along the line IV—IV of FIG. 2.

As shown on the drawings:

In FIGS. 1 and 2 the reference numeral 10 designates generally a toy automobile of this invention. The automobile 10 includes a rectangular base platform or frame 11 conveniently formed of plywood or the like structural material. The rear portion of the platform 11 is reinforced by a rigid board or framework 12 secured to the underside of the platform. A fixed transverse axle 13 is secured to the board 12 at the rear end of the platform and wheels 14 are rotatably mounted on this fixed axle closely adjacent the side edges of the platform. As shown in FIG. 2 the wheels 14 preferably extend beyond the rear of the platform.

A swing axle assembly 15 is provided near the front end of the platform but spaced rearwardly from this front end. This swing axle assembly 15 includes a board or bar 16 with a flat top face bearing against the bottom of the platform. A pivot pin 17 swingably connects the board 16 with the platform 11 at the longitudinal center of the platform but materially spaced rearwardly from the front of the platform. As shown in FIG. 2 the board 16 is longer than the width of the platform 11 so as to project beyond both sides of the platform.

An axle 18 is carried by the board 16 and wheels 19 are rotatably mounted on the ends of the axle. As shown in FIG. 2 these wheels 19 are spaced laterally outward from the wheels 14 to increase the lateral stability of the platform and to accommodate swinging of the axle assembly 15 about the pivot 17 for steering the automobile. A tow rope 20 is secured to the axle assembly 15 at the outer ends of the board 16.

The front end of the platform 11 has a transverse upright board simulating an automobile radiator.

A dashboard assembly 22 is mounted on the platform 11 to extend upwardly and forwardly for dividing the platform into a front engine compartment 23 and a rear passenger compartment 24. This dashboard assembly includes side uprights 25 with reinforcing gusset boards 26 secured to the reinforcing board 12 under the platform. The top ends of the uprights 25 are connected by a cross board 27. An opening 28 is thus provided between the front and rear compartments 23 and 24 under the board 27 and between the uprights 25.

A simulated steering column 29 extends from the front board 21 through the cross board 27 of the dash assembly and a steering wheel 30 is mounted on the end of this steering column 29 in the passenger compartment 24.

A pair of parallel strips of linoleum 31 are secured to the platform 11 in the passenger compartment 24 thereof to extend rearwardly from the dashboard assembly 22. Adhesive or fasteners can be used to fixedly unite the linoleum strips to the top face of the platform 11. While linoleum strips are preferred, it should be understood that other smooth impervious material could be used.

A seat assembly 32 is provided for mounting on the linoleum strips 31. This seat assembly 32 includes a flat base 33 and an upright back 34 on the base preferably equipped with a strap or harness 35 to secure a child or infant to the seat. The base 33 is sized so that it will fit over and span both linoleum strips 31.

Four rubber suction cups 36 are secured to the underface of the seat base 33 as by means of screw fasteners 37. These suction cups 36 are positioned to engage the linoleum strips 31 and to provide maximum stability for the seat on the platform. Thus, as shown in FIG. 3, the front pair of suction cups is positioned at the forward corners of the base 33 while the rear pair is positioned adjacent the rounded rear end of the base but laterally inward from the front pair. As shown in FIG. 2 this spacing of the suction cups provides maximum stability in all directions.

The seat 32 is thus detachably connected to the platform 11 in the passenger compartment 24 through the media of the suction cups 36 and the impervious strips 31.

To position a small child or infant properly on the vehicle 10, the seat 32 can be completely removed from the vehicle and the infant strapped into the seat. The seat with the strapped in occupant is then easily mounted on the vehicle relative to the dashboard 22. The forward incline of the dashboard 22 facilitates positioning of the occupant's legs through the opening 28 and the seat is easily longitudinally positioned on the strips 31 so that the occupant will have full access to the steering heel 30. The harness or belt 35 and the uprights 25 cooperate to prevent the occupant from falling off the vehicle.

The seat is fixedly united to the linoleum strips by pressing the base 33 toward the strips and is easily removed from the vehicle by cocking the base relative to the strips or by prying the suction cups off the strips. While the specific size of the toy vehicle of this invention is not critical, it is extremely useful as an infant's toy or carriage when the platform is about one yard long and from 12 to 15 inches wide. Obviously the engine compartment 23 could be covered with a hood and other decorations could be added to the basic parts illustrated in FIGS. 1 to 4.

As shown in FIG. 1 the seat 32 has a wide range of lateral positions from a full forward position with the base 33 projected between the uprights 25 to a rearward position with the base spaced rearwardly from the uprights. In all operative positions of the seat, however, the legs of the occupant will project through the opening 28 of the dashboard assembly.

From the above description it should therefore be understood that this invention now provides a simple inexpensive toy vehicle or carriage for small children and infants which has an adjustable seat construction that does not require any tools or mechanical devices for effecting adjustment. The seat arrangement is safe and cooperates with a dashboard arrangement to prevent injury to even the smallest of infants.

I claim as my invention:

A toy automobile or the like vehicle which comprises a platform, a pair of rear wheels rotatably mounted on the rear end of the platform, a front wheel assembly pivotally mounted on the front end of the platform, a tow rope secured to said front wheel assembly for pulling and steering the vehicle, a dashboard assembly mounted on the platform between the front wheel assembly and the rear wheels, said dashboard assembly including forwardly inclined uprights on the sides of the platform and a forwardly inclined cross bar coacting with the uprights to define a leg-receiving opening between said uprights, a simulated steering column extending rearwardly from the cross bar, a simulated steering wheel on said column adjacent the cross bar, impervious material on said platform rearwardly of said dashboard assembly, a baby seat having a plurality of suction cups on the bottom thereof adapted to detachably secure the seat to said material in variably spaced relation from the steering wheel, harness means on said seat to retain a baby therein, said forwardly inclined cross bar facilitating positioning of the legs of a baby harnessed in said seat through the leg-receiving opening of said dashboard assembly when said seat is lowered onto said material, said seat being positioned in selected spaced relation behind said dashboard assembly to place the steering wheel within reach of a baby harnessed in the seat and to position the legs of the baby between said uprights, and said uprights forming guards for the legs of the baby.

References Cited in the file of this patent

UNITED STATES PATENTS

| | | |
|---|---|---|
| D. 67,617 | Salom | June 16, 1925 |
| D. 180,264 | Black | May 14, 1957 |
| 1,327,240 | Kirkpatrick et al. | Jan. 6, 1920 |

FOREIGN PATENTS

| | | |
|---|---|---|
| 158,278 | Australia | Aug. 17, 1954 |